United States Patent
Hack et al.

[11] Patent Number: 5,153,420
[45] Date of Patent: Oct. 6, 1992

[54] TIMING INDEPENDENT PIXEL-SCALE LIGHT SENSING APPARATUS

[75] Inventors: Michael Hack, Mountain View; Alan G. Lewis, Sunnyvale; Richard H. Bruce, Los Altos, all of Calif.

[73] Assignee: Xerox Corporation, Stamford, Conn.

[21] Appl. No.: 619,360

[22] Filed: Nov. 28, 1990

[51] Int. Cl.$^5$ .............................................. H01J 40/14
[52] U.S. Cl. .............................. 250/208.1; 358/213.22
[58] Field of Search .............. 250/208.1; 358/213.22, 358/213.31; 357/32, 30 H

[56] References Cited

U.S. PATENT DOCUMENTS

| | | | |
|---|---|---|---|
| 4,345,248 | 8/1982 | Togashi et al. | 340/784 |
| 4,363,963 | 12/1982 | Ando | 357/30 H |
| 4,382,187 | 5/1983 | Fraleux et al. | 357/32 |
| 4,395,736 | 7/1983 | Fraleux | 358/213 |
| 4,407,010 | 9/1983 | Baji et al. | 357/30 H |
| 4,542,409 | 9/1985 | Ochi | 358/213.22 |
| 4,655,552 | 4/1987 | Togashi et al. | 350/342 |
| 4,819,070 | 4/1989 | Hyneck | 358/213.22 |
| 4,876,585 | 10/1989 | Ozawa | 357/24 |
| 4,957,659 | 9/1990 | Arques | 250/208.1 |
| 4,980,546 | 12/1990 | Berger | 250/208.1 |

*Primary Examiner*—David C. Nelms
*Assistant Examiner*—Michael Messinger
*Attorney, Agent, or Firm*—Jonathan A. Small

[57] ABSTRACT

A light sensing apparatus adaptable for inclusion in an array of such apparatus is operable independent of polling cycle providing a more accurate sensing of the patterns of illumination incident on an array of such apparatus. The apparatus facilitates utlizing each address line to simultaneously initialize one row of apparatus while enabling the subsequent row of apparatus. The apparatus is also compatible with elements capable of providing gain, given that the photosensitive element is separate from the path across which voltage or current is measured. The apparatus may be fabricated of amorphous silicon. The light sensing cell includes an input terminal, an output terminal, a conductive element electrically interconnecting the input and output terminals, a multiple-state sensing device, means for establishing an initial state of the sensing device, means for changing the initial state of the sensing device in response to the incidence of electromagnetic or ionizing radiation (e.g., visible light) thereupon, and means connected to the conductive element and to the sensing device for modifying the conductance of the conductive element as a function of the state of the sensing device. A color filter may be interposed between a light source and the circuit or the array to provide color differentiation. Use of other filters and/or sensor types facilitates sensing electromagnetic radiation outside the visible light spectrum.

28 Claims, 3 Drawing Sheets

TIMING INDEPENDENT PIXEL-SCALE LIGHT SENSING APPARATUS

BACKGROUND OF THE INVENTION

The present invention relates generally to light sensing apparatus which are suitable for large-area integration, and more particularly to a light sensing circuit or array of light sensing circuits able to indicate the incidence of light occurring at any time during a polling cycle, and configured to allow structuring of the circuit to provide gain.

Present sensing apparatus, such as solid state sensor arrays or imaging devices, often involve as many as 1 million picture elements ("pixels") or more. These sensing apparatus may be stand-alone, or may be incorporated into a combined sensing/display apparatus such as that disclosed and described in copending U.S. application Ser. No. 07/626,795. Such sensing apparatus are employed in systems such as medical or industrial imaging systems, position or motion sensors, interactive displays, etc.

Typically, the sensing apparatus of these systems is divided up into unique cells capable of individually sensing light incident upon them. Each of these light sensing cells usually includes selected circuitry and a photosensitive element whose current-voltage characteristics change in response to the incidence of light. Knowledge of the correlation between the intensity of light incident on the photosensitive element and the change in current-voltage characteristics allows such a device not only to indicate the incidence of light, but also to indicate the intensity (number of photons) of the incident light. This also facilitates design of a sensing apparatus capable of discriminating between light not intended to be sensed, such as ambient light, and light intended to be sensed, such as light from a light pen. In these light sensing cells, the photosensitive element is typically connected such that an electrical potential is established across it. Light incident on the photosensitive element will result in a detectable change of the potential and/or result in a current flow between two points in the cell. In general, each cell may be checked for the results of incident light. The checking of an individual cell shall be referred to hereafter as "polling" of that cell, and one complete check of all such cells of an array shall be referred to as a "polling cycle".

The arrangement of these cells presents a number of drawbacks and disadvantages. In some present devices, in order for the incident light to be detected, the light must be incident on the photosensitive element at the time it is polled. That is, the incidence of light and the measuring for the effect that it has on a sensor must coincide. If it so happens that light is incident on the photosensitive element only between successive pollings of that element, and not at the time the photosensitive element is polled, the polling will fail to indicate the incidence of light.

In small arrays of light sensing cells, there is a certain amount of tolerance for this coincidence requirement. The time period between successive pollings of a cell is usually smaller than the time period the light is incident on the photosensitive element of that cell. Furthermore, together, the array of cells will detect enough incident light to make up for any such coincidence errors at individual cells. However, when the aforementioned large number of pixels, i.e., 1 million or more, is reached, the time between successive pollings of a cell may increase and the coincidence of the light falling upon the photosensitive element and polling of the cell becomes a real concern. Also, where accuracy of detection is critical, it is desirable to overcome this need for coincidence.

Another drawback or disadvantage of some present light sensing cells, and in particular, arrays of such cells, is the need for three or more separate metal line or interconnections per cell. A common or global power line and a data line tied low or to ground are used to establish the potential across the photosensitive element, and a third line is used to select the cell for polling. It is highly desirable to minimize the number of required interconnections in order to minimize the number of faulty rows of cells per array, minimize the additional required metal per cell, and minimize the size of each cell.

A third drawback or disadvantage of present light sensing cells is that since the photosensitive element forms part of the path across which voltage or current is measured, they are not compatible with circuitry capable of providing gain. A photosensitive element capable of providing gain, particularly photoconductive gain, is described in U.S. Pat. No. 5,083,175, entitled "Method of Using Offset Gated Gap-Cell Thin Film Device As A Photosensor" which is incorporated by reference herein. Use of these elements is desirable since they allow a large dynamic range (i.e., the ratio of photocurrent to dark current) between ON and OFF states and hence a large number of discernible gray levels, and allow switching between photoconductive states with lower levels of light.

In addition to the above, there is also a need for improved large area sensor apparatus in general. Specifically, silicon is a desirable material from which to manufacture sensing apparatus due to its electrical photodependence (e.g., variable conductance as a function of incident light). However, crystalline silicon devices are limited in size by the size of the silicon wafer on which the individual sensors are formed. Amorphous silicon has proved to be an advantageous material from which to form large area arrays due to its attractive electronic characteristics, relatively simple, inexpensive, and low temperature fabrication requirements, and the ability to form large arrays (in excess of 12 inches by 12 inches) on substrates such as glass.

SUMMARY OF THE INVENTION

The present invention has come about through the realization that it would be highly desirable to be able to sense the incidence of light on a cell at any time, independent of the timing of the polling of the cell itself. Thus, one aspect of the present invention is the provision of a novel, light sensing circuit allowing detection of incident light at any time during the polling cycle. Related to this aspect is the aspect that the present invention allows independently maintaining the unique illumination information about each cell.

Traditional two dimensional arrays are provided with a number of row address lines, each typically associated with a horizontal row of cells. It forms another aspect of the present invention that each row address line is designed to simultaneously serve two purposes. First, the line serves to enable the sensor circuits associated with each cell of a row of cells so that light incidence information may be read out from that row, and second, the line serves to reset each sensor circuit of the cells of the immediately preceding row to a state wherein the sensors may detect light. Thus, it forms a related aspect of the present invention that each cell requires only two interconnection lines, and does not require a global power line.

It is another aspect of the present invention that the photosensitive element employed in each cell is separated and distinct from the path across which the voltage or current is measured to determine whether or not light has been incident upon the cell. By structuring the cell in this fashion, a circuit may be provided which is capable of providing gain. Further, if a photosensitive element, such as that described in the aforementioned patent application, is employed in the circuit, photoconductive gain may also be provided.

It is yet another aspect of the present invention, that the circuitry disclosed herein may be monolithically formed of amorphous silicon according to amorphous silicon processing techniques known in the art. This enables large-scale integration and production of large sized arrays of cells according to the present invention, and allows utilization of the simple, inexpensive, and low temperature fabrication techniques used in amorphous silicon processing.

The present invention overcomes a number of the disadvantages and limitations of the prior art by providing a light sensing apparatus of the type including an input terminal, an output terminal, a conductive element electrically interconnecting the input and output terminals, a multiple-state (discrete or continuous) sensing device, means for establishing an initial state of the sensing device, means for changing the initial state of the sensing device in response to the incidence of electromagnetic or ionizing radiation (e.g., visible light) thereupon, and means connected to the conductive element and to the sensing device for modifying the conductance of the conductive element as a function of the state of the sensing device.

The scope of the present invention and the manner in which it addresses the disadvantages and limitations associated with the prior art will become more readily apparent from the following detailed description when taken in conjunction with the accompanying drawings and claims.

DETAILED DESCRIPTION

Figure 1:
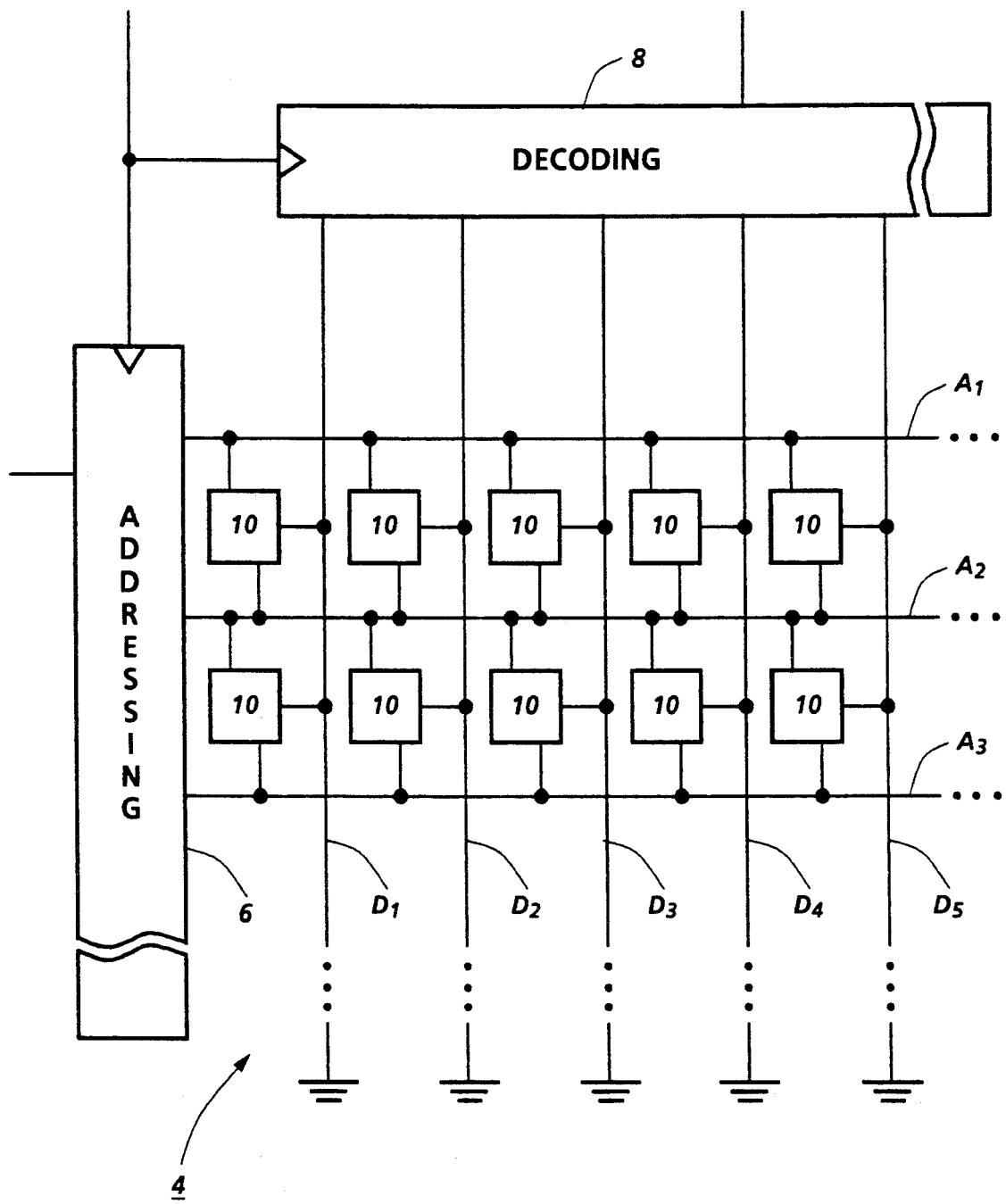
FIG. 1 shows a two dimensional sensor array employing a timing independent pixel scale light sensing apparatus according to the present invention.

Referring to FIG. 1, there is shown therein a two dimensional sensor array 4, comprising addressing means 6, decoding means 8, a plurality of cells 10, and a grid-like pattern of horizontal electrically conductive lines or interconnections which, for the present description, will be hereinafter referred to as row address lines, designated as $A_1, A_2, \ldots A_n, A_{n+1}, \ldots$, and vertical electrically conductive lines or interconnection which, for the present description, will be hereinafter referred to as column data lines, designated as $D_1, D_2, \ldots D_s, \ldots$. In such an array 4 each cell 10 must be individually addressable. This independent addressing is conveniently and commonly facilitated by the grid-like pattern of interconnections shown. Such an array 4 is capable of sensing the incidence of light thereon at any time during the polling cycle of the individual cells 10. Each of the elements of array 4 will be described in further detail herein, with a focus on the timing independent light sensing ability of cells 10.

As shown in FIG. 1, bounding each cell 10 in the two dimensional array 4 will be a first row address line $A_n$ and a second row address line $A_{n+1}$, as well as at least one column data line $D_s$. A typical cell 10 of the two dimensional array 4 is shown in FIG. 2, in which like reference numerals denote like elements of the present invention as between each of the figures herein.

Figure 2:
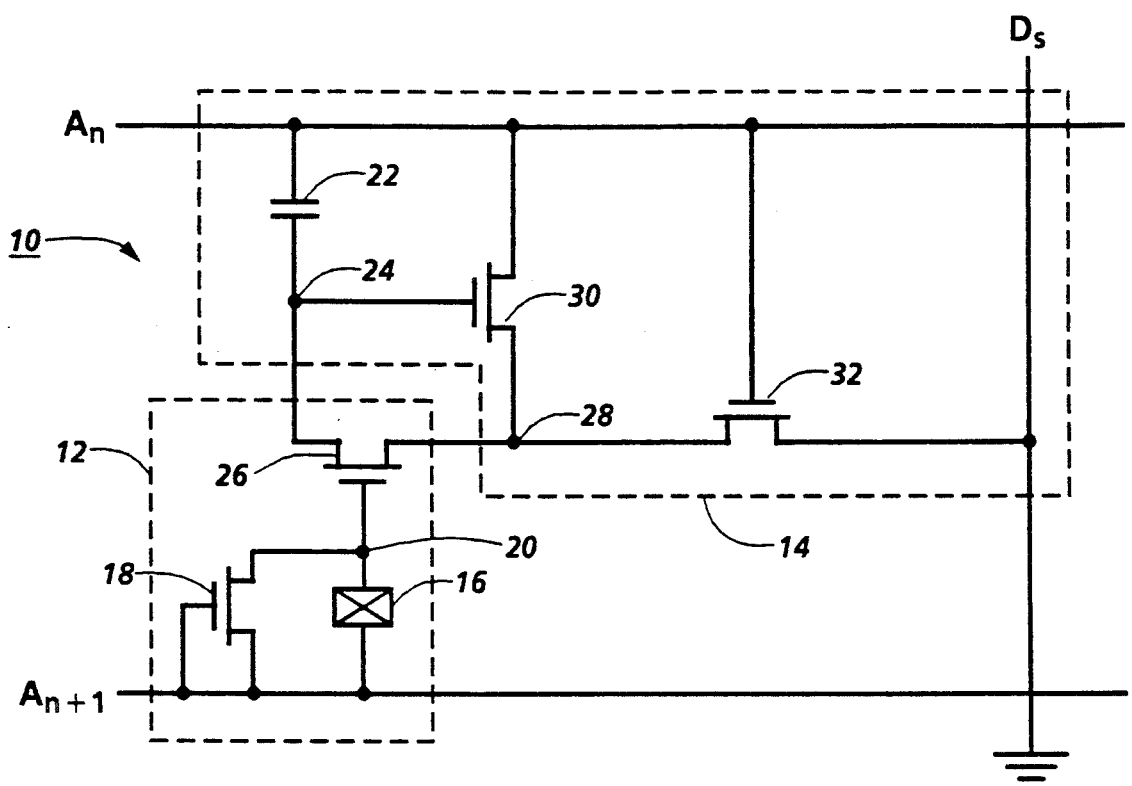
FIG. 2 shows a detailed schematic illustration of a timing independent pixel scale light sensing circuit according to one embodiment of the present invention.

With reference now to FIG. 2, cell 10 may, for the purposes of illustration, be divided into two regions: first, a photosensor circuit region 12, and second, a current conducting region 14. This illustrates the physical separation between the photosensitive element and the path across which the voltage or current of the cell is measured, as discussed above. The photosensor circuit region 12 of the embodiment of FIG. 2 consists of a multiple-state photoelectric sensing means 16, and two control means such as transistors 18 and 26. Multiple-state photoelectric sensing means 16 (or simply photoelectric sensing means 16) may be one of a wide variety of sensors of the type described above which has at least two states, ON and OFF. For example, photoelectric sensing means 16 may be a photosensor of the type described in the aforementioned U.S. Pat. No. 5,083,175. The ON state may be either the conductive state or the current producing state of means 16. Alternatively, photoelectric sensing means 16 and transistor 18 may be replaced by a single photovoltaic device such as photodiode 12' shown in FIG. 2a.

Transistors 18 and 26, as well as all transistors referred to and described herein, unless otherwise noted, are of the type including a control terminal, or gate electrode, and a current path, or channel, controlled by said control terminal, said channel having first and second ends connected to first and second channel electrodes, respectively. Such transistors will generally be of the field effect transistor (FET) family, although other types of transistor devices may be employed with the same or similar results as described herein. In the event the array is fabricated from amorphous silicon, such transistors will generally be N-channel transistors, although other arrangements such as P-channel devices may be employed where appropriate. Transistor 18 is connected such that its gate electrode and a first of its channel electrodes are connected to row address line $A_{n+1}$. The second of its channel electrodes is connected to a first node 20. Photoelectric sensing means 16 is connected such that one terminal thereof is connected to row address line $A_{n+1}$ and a second terminal thereof is connected to first node 20. The gate electrode of transistor 26 is connected to node 20, a first of its channel electrodes is connected to a second node 24, and a second of its channel electrodes is connected to a third node 28.

The current conducting region 14 of the embodiment of the present invention shown in FIG. 2 consists of a capacitor 22 having one terminal thereof connected to row address line $A_n$, and a second terminal connected to second node 24. Current conducting region 14 also includes transistor 30, one of whose channel electrodes is connected to node 28. The gate of transistor 30 is connected to node 24, while the other of its channel electrodes is connected to row address line $A_n$. A first channel electrode of a third transistor 32 will also be connected to node 28. The gate of transistor 32 is connected to row address line $A_n$ and its second channel electrode is connected to column data line $D_s$.

The ability to produce each of the elements described above, including the inner-cell interconnections, in large area format by relatively simple and inexpensive processes afforded by amorphous silicon technology motivates the monolithic fabrication of all such components of cell 10 from that material. However, equivalent results would be obtained, and specific design goals may be realized, by fabricating some or all of the components of circuit 10 from single crystal or polycrystalline silicon, germanium, etc.

The method of operation of the device is as follows. One role of addressing means 6 (FIG. 1) is to sequentially raise each row address line in the array to a given voltage level, one row address line at a time, starting first with line $A_1$, then $A_2$, $A_3$, ... A row address line is raised to and held at an elevated, or high voltage for a predetermined period of time then returned to a low voltage. After a suitable amount of time the voltage of the next row address line is raised and held high for the predetermined period of time. Each of the column data lines will, however, be held at a low potential or tied to ground. In general terms, cell 10 will act as a switchable current path between a row address line and a column data line. That is, if light has been incident upon cell 10, when its associated row address line $A_n$ is raised to a high voltage, current will be allowed to pass between that row address line $A_n$ and an associated column data line $D_s$. If, however, light has not been incident on cell 10, current will be prevented from passing between row address line $A_n$ and column data line $D_s$. Thus, by examining the current flow on data address line $D_s$, which is in part the role of decoding means 8, it may be determined whether light has been incident upon cell 10. In fact, by examining the current available from each of the data lines of the entire array it is possible to determine which of the photosensitive elements of the cells of the array have been exposed to light.

More specifically, in order to allow current conducting region 14 to conduct the current flow through cell 10 as a function of the incidence of light thereon, a charge is established by an address line which may be maintained or released as a function of the incidence of light on the photosensor circuit region 12. Establishing this charge shall hereinafter be referred to as "initializing" cell 10. According to the present embodiment, cell 10 is initialized by charging the gate-channel capacitance of transistor 26. As described above, each cell 10 is connected to two row address lines $A_n$ and $A_{n+1}$. According to the above discussion, only a single row address line may be at a high voltage at any one time. This is to allow unique identification of the cell, or in other words to allow unique identification of the illumination state of each pixel. It is conventional that the row address line associated with the cell be the line immediately above that cell, which for FIG. 2 means cell 10 and row address line $A_n$. However, according to the present invention, each row address line will also function to initialize a cell 10 immediately above that line. That is, cell 10 will be initialized by the application of a voltage to line $A_{n+1}$.

Assume for explanation that the gate and channel of transistor 26 are at the same potential, equal to a low voltage as compared to the voltage of row address line $A_{n+1}$. Assume next that in cyclically applying a voltage to each row address line, a positive voltage with respect to ground, for example on the order of 10 volts or more, is applied to row address line $A_{n+1}$. That is, assume that the voltage on row address line $A_{n+1}$ is high. A high voltage is then applied to the gate of transistor 18. A first channel electrode of transistor 18 will thus be at a low voltage as compared to the gate, rendering the channel of transistor 18 conductive (i.e., transistor 18 is turned "ON"). This connects the first channel electrode of transistor 18, and in turn the gate of transistor 26, to the high voltage row address line $A_{n+1}$ via the second channel electrode. The channel of transistor 26 is held close to the low of line $A_n$ by transistor 30. The gate-to-channel capacitance is thereby charged to near the high voltage of row address line $A_{n+1}$. When row address line $A_{n+1}$ returns to the low voltage state, the channel of transistor 18 ceases to be conductive (i.e., transistor 18 is turned "OFF") and the connection between its channel electrodes is broken. This effectively isolates the gate of transistor 26 with a high potential between it and the channel, thus initializing the cell.

The cyclical raising of the voltage on each row address line of the array continues until row address line $A_n$ is reached. Raising the voltage on that line will "enable" the cells 10 connected to it from below. The effect of enabling a particular cell 10 will depend on whether light has been incident upon the photoelectric sensing means 16 of that cell 10 between the time the cell was initialized and the time it was enabled.

Assume first that light has been incident on the photoelectric sensing means 16 at some point during this time. The effect that the incident light will have will depend on the nature of the photoelectric sensing means 16, but for the purposes of explanation it will be assumed that the incident light renders device 16 conductive. This will create a current path between the high voltage of the gate of transistor 26 and the low voltage of line $A_{n+1}$. The stored charge between the gate and channel of transistor 26 will be discharged, bringing the gate and first and second channel electrodes to about the same voltage. This will render the channel of transistor 26 essentially nonconductive. The role of capacitor 22 is to weakly couple the row address line $A_n$ to the gate of transistor 30. Thus, when $A_n$ is at the high voltage state, the gate of transistor 30 will also be at that high voltage state due to capacitive coupling through capacitor 22. Since transistor 26 is essentially an open circuit between nodes 24 and 28 (although there will be a degree of current leakage inherent in each of the transistors), there is no direct current path between the gate of transistor 30 and the low (or ground) voltage of the column data line $D_s$. This presents a sufficiently high potential difference between the gate of transistor 30 and a first of its channel electrodes to thereby render its channel conductive. The channel of transistor 32 (described in further detail below) will also be conductive since its gate is at the high voltage of row address line $A_n$ and a first of its channel electrodes is at the low voltage of column data line $D_s$. Therefore, a current path is provided between row address line $A_n$ and column data line $D_s$. A poll of column data line $D_s$ at this point would show a current flow (typically on the order of microamps for a time period of microseconds), which would be interpreted by appropriate circuitry (not shown) as an indication that sufficient light had been incident on cell 10.

If, however, light has not been incident on the photoelectric sensing means 16 during the time between the initializing of the circuit and the raising of the voltage on row address line $A_n$, the gate-to-channel potential difference of transistor 26 remains high. The channel of transistor 26 is then conductive. Since this allows the gate and both channel electrodes of transistor 30 to be at approximately the same high voltage, the channel of transistor 30 is nonconductive. This blocks the only effective current path between row address line $A_n$ and column data line $D_s$, since capacitor 22 does not pass D.C. current. A poll of column data line $D_s$ at this point would show very low current flow, which would be interpreted by appropriate circuitry (not shown) as an indication that insufficient light had been incident on cell 10.

Figure 2A:
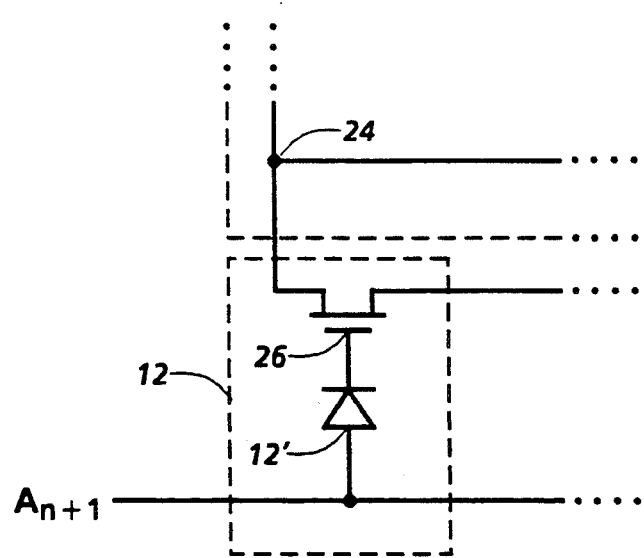
FIG. 2a shows a partial schematic of another embodiment of a timing independent pixel scale light sensing circuit, related to the embodiment of FIG. 2, according to the teachings of the present invention.

With reference to the embodiment of the present invention shown in FIG. 2a, operation of the cell is essentially as described above except for the following. Photoelectric sensing means 16 and transistor 18 are replaced by the single photovoltaic device, photodiode 12', which is connected such that it is forward biased between row address line $A_{n+1}$ and the gate of transistor 26 when row address line $A_{n+1}$ is high. When this is the case, the charging of the gate-to-channel capacitance of transistor 26 is as described above. When row address line $A_{n+1}$ is returned to low, the gate of transistor 26 is isolated, and subject to leakage, the gate-to-channel capacitance of the transistor remains charged. When light is incident on the photodiode, electron-hole pairs are generated which result in a photogenerated current flow, discharging the gate-to-channel capacitance of transistor 26. The photogenerated current is proportional to the incident light intensity. Thus, polling of cell 10 yields the illumination state information as described above.

It is the nature of transistors employed in cells such as that described above that they will have a certain degree of leakage current in their OFF state (i.e., when current flow in the channel should be blocked). This is important from two points of view. First, this must be taken into account when selecting the capacitance of capacitor 22. The capacitance of capacitor 22 must be large enough that the potential difference between the gate and channel of transistor 30 (due to leakage through transistor 26) does not discharge too quickly, but small enough that when transistor 26 is ON it can discharge quickly. Second, leakage current must be prevented from affecting the state of column data line $D_s$ when the cell is not being polled. Since a great many other cells will be sharing column data line $D_s$, and since the current to be detected on column data line $D_s$ is on the order of microamps, the collective leakage onto data line $D_s$ poses the threat of overpowering the valid data which must be detected. Transistor 32, which is nonconductive at all times except when row address line $A_n$ is in the high-voltage state, isolates cell 10 from column data line $D_s$ except when cell 10 is being polled.

Figure 3:
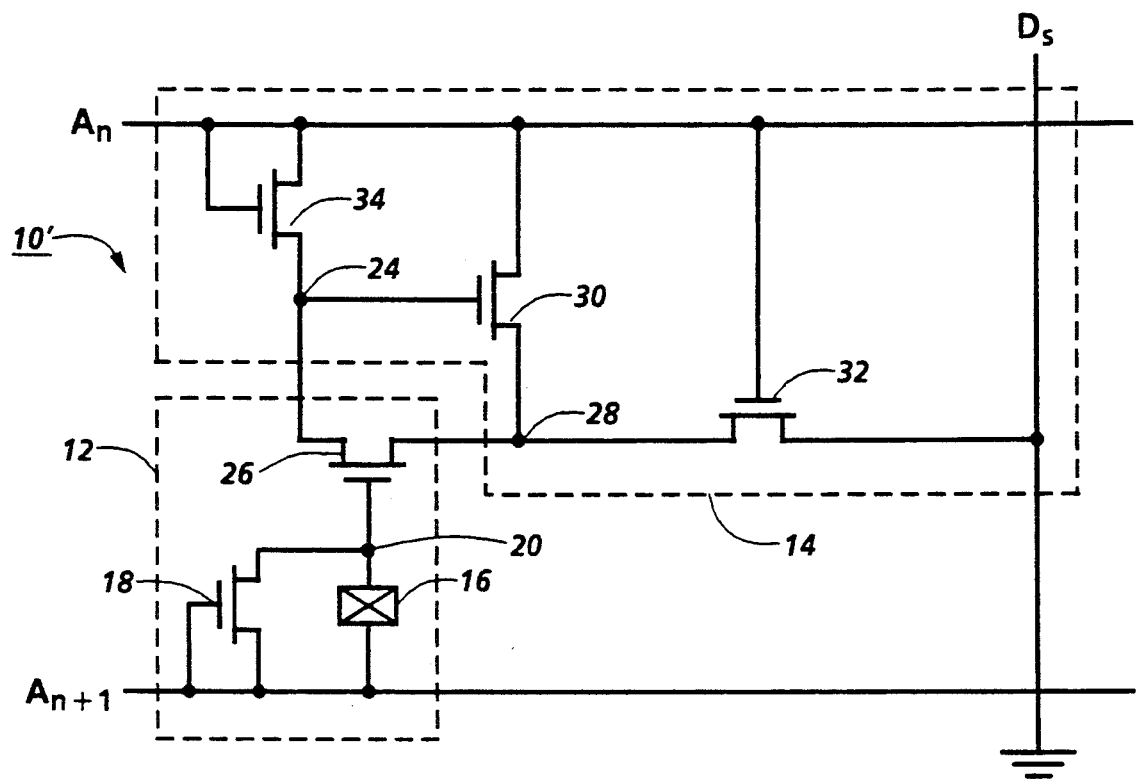
FIG. 3 shows a detailed schematic illustration of a timing independent pixel scale light sensing circuit according to another embodiment of the present invention.

Referring now to FIG. 3, in which the reference numerals used above are also used to refer to like elements, another embodiment of the present invention is shown. The cell 10' of FIG. 3 differs from the cell 10 previously described only insofar as capacitor 22 has been replaced by transistor 34 having its gate and one of its channel electrodes electrically connected to row address line $A_n$ and a second of its channel electrodes electrically connected to node 24. One role of transistor 34 is identical to that of capacitor 22—to weakly couple the row address line $A_n$ to the gate of transistor 30. The functional difference of this change, however, is to provide a more linear response with respect to the input to cell 10'. That is, the embodiment of FIG. 2 is better suited for digital response since, if sufficient light is incident on sensor 16, a fixed current will flow between address line $A_n$ and data line $D_s$ (although an analog response may be obtained if desirable). However, the embodiment of FIG. 3 is better suited to provide a degree of analog response, or gray scale resolution in that the current flow between address line $A_n$ and data line $D_s$ will vary as a function of the level of incident light.

The charging of the gate-channel capacitance of transistor 26 in this embodiment is identical to that described above. Furthermore, operation of this embodiment in the case where light has been incident upon sensor 16 is also as described above. In fact, operation of the embodiment of FIG. 3 in the case where light has not been incident upon sensor 16 is also as described above except for the fact that since transistor 34 is capable of passing D.C. current whereas capacitor 22 of the embodiment of FIG. 2 is not, there is an additional design consideration for this embodiment required to limit the active current path to that through the channel of transistor 30. Transistor 26 is used to control the potential difference between gate and channel of transistor 30. In order to accomplish this, the current carrying capacities of transistors 26 and 34 must be carefully selected. Essentially, when row address line $A_n$ is raised to a high voltage, transistor 34 will be turned ON. This allows row address line $A_n$ to attempt to pull the voltage at node 24 high. However, if light has not been incident on sensor 16, the gate-channel potential of transistor 26 will be high, allowing current to flow through its channel. Thus, competing with address line $A_n$ (via transistor 34) to pull node 24 up to a high voltage will be data line $D_s$ (via transistors 26 and 32) tending to pull node 24 down to a low voltage. By properly selecting the aspect ratio of each of transistors 34 and 26, the current capacity of these transistors may be established such that current through transistor 34 is below the threshold for detection on column data line $D_s$ if no illumination is present, but large enough to allow node 24 to be raised to the high voltage of row address line $A_n$ if illumination is present. Furthermore, if the current capacity of transistor 26 is made to be much greater than the current capacity of transistor 34 then the pull on node 24 by data line $D_s$ will overcome the pull on node 24 by address line $A_n$, and the circuit will settle out with node 24 at the low voltage. In this case, the potential difference between gate and channel of transistor 30 will be below its turn-on threshold, and current will not pass between row address line $A_n$ and column data line $D_s$, which is the desired result when light has not been incident on sensor 16.

Figure 3A:
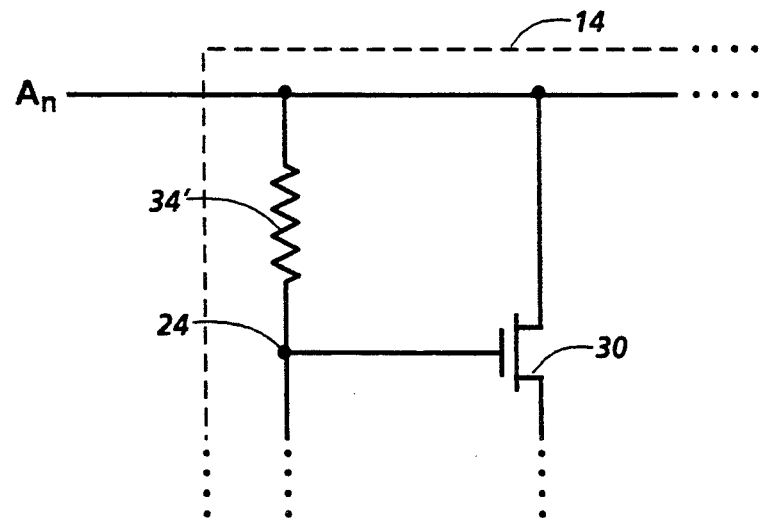
FIG. 3a shows a partial schematic of another embodiment of a timing independent pixel scale light sensing circuit, related to the embodiment of FIG. 3, according to the teachings of the present invention.

The role of capacitor 22 and transistor 34, to weakly couple row address line $A_n$ to the gate of transistor 30, may also be served by a resistor such as resistor 34' shown in FIG. 3a. Operation of the apparatus of FIG. 3a is virtually identical to that described above with regard to transistor 34. In this embodiment consideration must also be given to the current capacities of the various devices, as described above.

In general, gray scale sensing may be accomplished by cell 10' as follows. The potential difference between the gate and channel of transistor 26 will roughly be controlled by the amount of light falling on sensor 16. That is, the greater the amount of light incident on sensor 16, the lower the final potential between the gate and the channel of transistor 26 will be. The level of discharge will, in turn, control the amount of current allowed to flow through the channel of transistor 26. This is facilitated by the ability of transistor 34 to allow current to flow through its channel, as compared to the blocking of current by capacitor 22. This controls the potential difference between the gate and channel electrode connected to node 28 of transistor 30. Finally, this controls the current which may flow through the channel of transistor 30. Polling of data line $D_s$ at this point will yield a current flow determined by the amount of light incident on sensor 16.

In general, to those skilled in the art to which this invention relates, many changes in construction and widely differing embodiments and applications of the present invention will suggest themselves without departing from its spirit and scope. For example, by placing a color filter over individual sensors, part of the sensor array or the entire sensor array of the present invention, it would be possible to selectively sense light of particular wavelengths. By blue filtering a pixel, for instance, the pixel will become relatively insensitive to red light input. This may be valuable in digitizing color images, distinguishing between different "color" light pens in a multi pen system, or other application where color differentiation is important. Furthermore, the sensor itself may be of a type capable of sensing the incidence of electromagnetic or ionizing radiation outside the visible portion of the spectrum. For instance, the sensor may of a type suited for sensing x-ray radiation, infrared radiation, neutron incidence, etc. Alternatively, specific filters may be used which allow sensing of specific portions of the electromagnetic spectrum outside the visible light region. The precise arrangement of such alternatives will depend upon the actual embodiment contemplated, and would be within the realm of one of ordinary skill in the art based on the present disclosure. Thus, the disclosures and descriptions herein are illustrative, and are not intended to be in any sense limiting.

What is claimed is:

1. A three terminal timing independent light sensing apparatus, comprising:
   an input terminal;
   an output terminal;
   a conductive element electrically interconnecting said input and output terminals;
   a multiple-state sensing device;
   terminal means for establishing an initial state of said sensing device;
   means connected to said sensing device for changing the initial state of said sensing device in response to the incidence of electromagnetic radiation thereupon; and
   means connected to said conductive element and to said sensing device for modifying the conductance of said conductive element as a function of the state of said sensing device.

2. The light sensing apparatus of claim 1, wherein the conductance of said conductive element may be maintained between its modification and initialization, independent of when said apparatus is polled.

3. The light sensing apparatus of claim 1, further including a color filter positioned proximate said means for changing the initial state of said sensing device, said color filter capable of discriminating between different wavelengths of incident light such that said means for changing the initial state of said sensing device changes the initial state of said sensing device when light within a selected bandwidth around a selected wavelength is incident thereon and does not change the initial state of said sensing device when light outside said bandwidth is incident thereon.

4. The light sensing apparatus of claim 1, further including means for providing gain connected to said conductive element.

5. An array of three terminal timing independent light sensing apparatus, comprising:
   a plurality of light sensing apparatus, each light sensing apparatus of the type including a sensor circuit, comprising:
      an input terminal;
      an output terminal;
      a conductive element electrically interconnecting said input and output terminals;
      a multiple-state sensing device;
      terminal means for establishing an initial state of said sensing device;
      means connected to said sensing device for changing the initial state of said sensing device in response to the incidence of electromagnetic radiation thereupon; and
      means connected to said conductive element and to said sensing device for modifying the conductance of said conductive element as a function of the state of said sensing device;
   a plurality of row interconnections, each said row interconnection electrically connected to at least one of said light sensing apparatus and each light sensing apparatus electrically connected to at least one row interconnection; and
   a plurality of column interconnections, each said column interconnection electrically connected to at least one of said light sensing apparatus and each said light sensing apparatus electrically connected to at least one column interconnection.

6. The array of claim 5, wherein each of said light sensing apparatus is electrically connected to two row interconnections, and at least one of said row interconnections capable of both establishing an initial state of a sensing device and enabling a light sensing apparatus.

7. The array of claim 5, wherein the conductance of said conductive element of said apparatus may be maintained between its modification and initialization, independent of when said apparatus is polled.

8. The array of claim 5, wherein each of said light sensing apparatus are formed of amorphous silicon.

9. The array of claim 5, further comprising a color filter positioned proximate each of said means for changing the initial state of said sensing device, said color filter capable of discriminating between different wavelengths of incident light such that said means for changing the initial state of said sensing device changes the initial state of said sensing device when light within a selected bandwidth around a selected wavelength is incident thereon and does not change the initial state of said sensing device when light outside said bandwidth is incident thereon.

10. The array of claim 5, wherein each said light sensing apparatus further includes means for providing gain connected to its conductive element.

11. A light sensing apparatus of the type which may be connected within a pixel circuit of the type having a plurality of row address lines and a plurality of column data lines, comprising:
- a capacitive element having first and second terminals, said first terminal connected to a first row address line;
- a first transistor having a control terminal and a current path controlled by said control terminal, said current path having first and second ends, said first end of said current path of said first transistor connected to a second row address line, said control terminal of said first transistor also connected to said second row address line;
- a photosensitive element having at least first and second terminals, said first terminal connected to said second row address line, said second terminal connected to said second end of said current path of said first transistor;
- a second transistor having a control terminal and a current path controlled by said control terminal, said current path having first and second ends, said first end of said current path of said second transistor connected to said second terminal of said capacitive element, said control terminal of said second transistor connected to said second terminal of said photosensitive element;
- a third transistor having a control terminal and a current path controlled by said control terminal, said current path having first and second ends, said first end of said current path of said third transistor connected to said first row address line, said second end of said current path of said third transistor connected to said second end of said current path of said second transistor, said control terminal of said third transistor connected to said second terminal of said capacitive element; and
- a fourth transistor having a control terminal and a current path controlled by said control terminal, said current path having first and second ends, said first end of said current path of said fourth transistor connected to said second end of said current path of said third transistor, said second end of said current path of said fourth transistor connected to a first column data line, said control terminal of said fourth transistor connected to said first row address line;
- whereby light incident upon said photosensitive element causes the conductivity of the current path of said second transistor to be reduced, and which thereby permits the current path of said third transistor to be sufficiently conductive to allow electrical communication between said first row address line and said column data line.

12. The light sensing apparatus of claim 11, wherein the effect of light incident upon said photosensitive element may be maintained for a selected period of time.

13. The light sensing apparatus of claim 11, wherein said light sensing apparatus is formed of amorphous silicon.

14. The light sensing apparatus of claim 11, further including a color filter positioned proximate said photosensitive element, said color filter capable of discriminating between different wavelengths of incident light such that said photosensitive element will indicate the incidence of light when said light is within a selected bandwidth around a selected wavelength, and will not indicate the incidence of light when said light is outside said bandwidth.

15. An array of light sensing apparatus, comprising:
- a plurality of light sensing apparatus of the type having a plurality of row address lines and a plurality of column data lines, comprising:
  - a capacitive element having first and second terminals, said first terminal connected to a first row address line;
  - a first transistor having a control terminal and a current path controlled by said control terminal, said current path having first and second ends, said first end of said current path of said first transistor connected to a second row address line, said control terminal of said first transistor also connected to said second row address line;
  - a photosensitive element having at least first and second terminals, said first terminal connected to said second row address line, said second terminal connected to said second end of said current path of said first transistor;
  - a second transistor having a control terminal and a current path controlled by said control terminal, said current path having first and second ends, said first end of said current path of said second transistor connected to said second terminal of said capacitive element, said control terminal of said second transistor connected to said second terminal of said photosensitive element;
  - a third transistor having a control terminal and a current path controlled by said control terminal, said current path having first and second ends, said first end of said current path of said third transistor connected to said first row address line, said second end of said current path of said third transistor connected to said second end of said current path of said second transistor, said control terminal of said third transistor connected to said second terminal of said capacitive element; and
  - a fourth transistor having a control terminal and a current path controlled by said control terminal, said current path having first and second ends, said first end of said current path of said fourth transistor connected to said second end of said current path of said third transistor, said second end of said current path of said fourth transistor connected to a first column data line, said control terminal of said fourth transistor connected to said first row address line;
  - whereby light incident upon said photosensitive element causes the conductivity of the current path of said second transistor to be reduced, and which thereby permits the current path of said third transistor to be sufficiently conductive to allow electrical communication between said first row address line and said column data line;
- said light sensing apparatus of said array of light sensing apparatus connected such that at least one first row address line of a light sensing apparatus is simultaneously a second row address line of another light sensing apparatus of said array of light sensing apparatus.

16. The array of claim 15, further comprising driving circuitry to apply a voltage to at least one of said row address lines, and further comprising decoding circuitry capable of identifying which of said light sensing apparatus of said array has passed current therethrough in response to the incidence of light.

17. The array of claim 15, wherein the effect of light incident upon each photosensitive element of a row of said photosensitive elements may be independently maintained for a selected period of time.

18. The array of claim 15, wherein each of said light sensing apparatus are formed of amorphous silicon.

19. The array of claim 15, further comprising a color filter positioned proximate each of said photosensitive elements, said color filters capable of discriminating between different wavelengths of incident light such that each said photosensitive element will indicate the incidence of light when said light is within a selected bandwidth around a selected wavelength, and will not indicate the incidence of light when said light is outside said bandwidth.

20. A light sensor of the type which may be connected within a pixel circuit of the type having a plurality of row address lines and a plurality of column data lines, comprising:
- a first transistor having a control terminal and a current path controlled by said control terminal, said current path having first and second ends, said first end of said current path of said first transistor connected to a first row address line, said control terminal of said first transistor also connected to said first row address line;
- a second transistor having a control terminal and a current path controlled by said control terminal, said current path having first and second ends, said first end of said current path of said second transistor connected to a second row address line, said control terminal of said second transistor also connected to said second row address line;
- a photosensitive element having at least first and second terminals, said first terminal connected to said second row address line, said second terminal connected to said second end of said current path of said second transistor;
- a third transistor having a control terminal and a current path controlled by said control terminal, said current path having first and second ends, said first end of said current path of said third transistor connected to said second end of said current path of said first transistor, said control terminal of said third transistor connected to said second terminal of said photosensitive element;
- a fourth transistor having a control terminal and a current path controlled by said control terminal, said current path having first and second ends, said first end of said current path of said fourth transistor connected to said first row address line, said second end of said current path of said fourth transistor connected to said second end of said current path of said third transistor, said control terminal of said fourth transistor connected to said second end of said current path of said first transistor; and
- a fifth transistor having a control terminal and a current path controlled by said control terminal, said current path having first and second ends, said first end of said current path of said fifth transistor connected to said second end of said current path of said fourth transistor, said second end of said current path of said fifth transistor connected to a first column data line, said control terminal of said fifth transistor connected to said first row address line;

whereby light incident upon said photosensitive element causes the conductivity of the current path of said second transistor to be reduced, and which thereby permits the current path of said third transistor to be sufficiently conductive to allow electrical communication between said first row address line and said column data line.

21. The light sensing apparatus of claim 20, wherein the effect of light incident upon said photosensitive element may be maintained for a selected period of time.

22. The light sensing apparatus of claim 20, wherein said light sensing apparatus is formed of amorphous silicon.

23. The light sensing apparatus of claim 20, further including a color filter positioned proximate said photosensitive element, said color filter capable of discriminating between different wavelengths of incident light such that said photosensitive element will indicate the incidence of light when said light is within a selected bandwidth around a selected wavelength, and will not indicate the incidence of light when said light is outside said bandwidth.

24. An array of light sensing apparatus, comprising:
a plurality of light sensing apparatus of the type having a plurality of row address lines and a plurality of column data lines, comprising:
- a first transistor having a control terminal and a current path controlled by said control terminal, said current path having first and second ends, said first end of said current path of said first transistor connected to a first row address line, said control terminal of said first transistor also connected to said first row address line;
- a second transistor having a control terminal and a current path controlled by said control terminal, said current path having first and second ends, said first end of said current path of said second transistor connected to a second row address line, said control terminal of said second transistor also connected to said second row address line;
- a photosensitive element having first and second terminals, said first terminal connected to said second row address line, said second terminal connected to said second end of said current path of said second transistor;
- a third transistor having a control terminal and a current path controlled by said control terminal, said current path having first and second ends, said first end of said current path of said third transistor connected to said second end of said current path of said first transistor, said control terminal of said third transistor connected to said second terminal of said photosensitive element;
- a fourth transistor having a control terminal and a current path controlled by said control terminal, said current path having first and second ends, said first end of said current path of said fourth transistor connected to said first row address line, said second end of said current path of said fourth transistor connected to said second end of said current path of said third transistor, said control terminal of said fourth transistor connected to said second end of said current path of said first transistor; and a fifth transistor having a control terminal and a current path controlled by said control terminal, said current path having first and second ends, said first end of said current path of said fifth transistor connected to said second end of said current path of said fourth transistor, said second end of said current path of said fifth transistor connected to a first column data line, said control terminal of said fifth transistor connected to said first row address line;

whereby light incident upon said photosensitive element causes the conductivity of the current path of said second transistor to be reduced, and which thereby permits the current path of said third transistor to be sufficiently conductive to allow electrical communication between said first row address line and said column data line; said light sensing apparatus of said array of light sensing apparatus connected such that at least one first row address line of a light sensing apparatus is simultaneously a second row address line of another light sensing apparatus of said array of light sensing apparatus.

25. The array of claim 24, further comprising driving circuitry to apply a voltage to at least one of said row address lines, and further comprising decoding circuitry capable of identifying which of said light sensing apparatus of said array has passed current therethrough in response to the incidence of light.

26. The array of claim 24, wherein the effect of light incident upon each photosensitive element of a row of said photosensitive elements may be independently maintained for a selected period of time.

27. The array of claim 24, wherein each of said light sensing apparatus are formed of amorphous silicon.

28. The array of claim 24, further comprising a color filter positioned proximate each of said photosensitive elements, said color filter capable of discriminating between different wavelengths of incident light such that each said photosensitive element will indicate the incidence of light when said light is within a selected bandwidth around a selected wavelength, and will not indicate the incidence of light when said light is outside said bandwidth.

* * * * *